US008657361B2

(12) United States Patent
Charnesky et al.

(10) Patent No.: US 8,657,361 B2
(45) Date of Patent: Feb. 25, 2014

(54) SYSTEM AND METHOD FOR ACTUATING MULTIPLE COMPONENTS IN A VEHICLE HAVING AN ACCESS OPENING

(75) Inventors: Scott P. Charnesky, Birmingham, MI (US); Jeffrey L. Konchan, Romeo, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 12/956,176

(22) Filed: Nov. 30, 2010

(65) Prior Publication Data
US 2012/0133175 A1    May 31, 2012

(51) Int. Cl.
*B60J 1/17* (2006.01)
*B60J 5/04* (2006.01)

(52) U.S. Cl.
USPC .......... 296/146.4; 296/146.2; 49/358; 49/506

(58) Field of Classification Search
USPC ............ 296/146.1, 146.2, 146.4, 146.9, 149, 296/150; 49/358, 506
See application file for complete search history.

(56) References Cited

U.S. PATENT DOCUMENTS

| 7,059,654 | B2 * | 6/2006 | Ichinose | 296/146.1 |
|---|---|---|---|---|
| 7,288,907 | B2 * | 10/2007 | Kamiya et al. | 318/266 |
| 2006/0254144 | A1 * | 11/2006 | Ottino | 49/279 |
| 2009/0217596 | A1 * | 9/2009 | Neundorf et al. | 49/506 |

\* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

An actuating system for a vehicle having a body that defines an access opening includes a panel arranged to selectively open and close at least a first portion of the opening. The system also includes multiple components operatively connected to the panel and adapted to be actuated. The system additionally includes a motor operatively connected to the panel and adapted to actuate the multiple components. A vehicle employing the system and a method for sealing an access opening in a body of a vehicle are also provided.

16 Claims, 5 Drawing Sheets

SYSTEM AND METHOD FOR ACTUATING MULTIPLE COMPONENTS IN A VEHICLE HAVING AN ACCESS OPENING

TECHNICAL FIELD

The invention relates to a system for actuating multiple components in a vehicle having an access opening.

BACKGROUND

A typical vehicle has at least one access door. Such a door typically has a latch mechanism for maintaining the door in a locked state until access into or egress from the vehicle is required. The latch mechanism is typically actuated by an outside door handle to gain access to the interior of the vehicle.

Some vehicles employ multiple side doors for access to the vehicle's interior. Commonly, when viewed from the front of the vehicle, such side doors are hinged proximate their front edge. Vehicles with multiple front-hinged side access doors typically employ a structural pillar, often called a B-pillar, on each side of the vehicle. Such pillars are generally situated between the access doors, and are used for mounting door hinges, as well as other various door and body hardware, thereto.

There are also vehicles that have multiple side doors, but do not employ a structural pillar between the doors. Instead, such pillar-less vehicles have a largely open space that gets selectively covered and uncovered by the multiple access doors. The pillar-less configuration is often used in vehicles employing a leading access door that is hinged near its front edge, but a trailing access door that is hinged near its rear edge. The absence of a structural pillar in such vehicles, however, removes a rigid and structurally sound location for mounting various door and body hardware.

SUMMARY

An actuating system for a vehicle having a body that defines an access opening includes a panel arranged to selectively open and close at least a first portion of the opening. The system also includes multiple components operatively connected to the panel and adapted to be actuated. The system additionally includes a motor operatively connected to the panel and adapted to actuate the multiple components.

The panel may be a first door arranged to selectively open and close at least a first portion of the opening. The multiple components may include a first component that is a window arranged to be adjusted for height and a second component that is a device adapted to retract when the first door is opened and protract when the first door is closed to thereby seal the at least a first portion of the opening. The motor may be a window regulator motor adapted to adjust the height of the window and selectively retract and protract the device.

A clutch may be operatively connected to each of the window regulator motor, the window, and the device. The clutch may be configured to operate the window regulator motor in a first mode of adjusting the height of the window and selectively retracting and protracting the device, a second mode of adjusting the height of the window, and a third mode of selectively retracting and protracting the device. The clutch may employ a shape memory alloy (SMA) material selectively energized to operate the window regulator motor in one of the first, second, and third modes. The clutch may be connected to the device via at least one of a torque transmitting cable and a push-pull or linear force transmitting cable A second door may be included to selectively open and close a second portion of the opening that remains open when the at least a first portion of the opening is closed by the first door. The device may be adapted to seal the first door to the second door when the second door is closed.

The opening may be an entryway on a side of the vehicle that is characterized by a front end, a rear end, and an absence of a B-pillar. In such a vehicle, the at least a first portion of the opening may be positioned toward the rear end of the vehicle and the second portion of the opening may be positioned toward the front end of the vehicle. Furthermore, wherein the vehicle lacks the B-pillar, the first door is rear-hinged and the second door is front-hinged.

A vehicle employing the above-described system and a method for sealing an access opening in a body of a vehicle are also provided.

The above features and advantages and other features and advantages of the present invention are readily apparent from the following detailed description of the best modes for carrying out the invention when taken in connection with the accompanying drawings.

DETAILED DESCRIPTION

Figure 1:
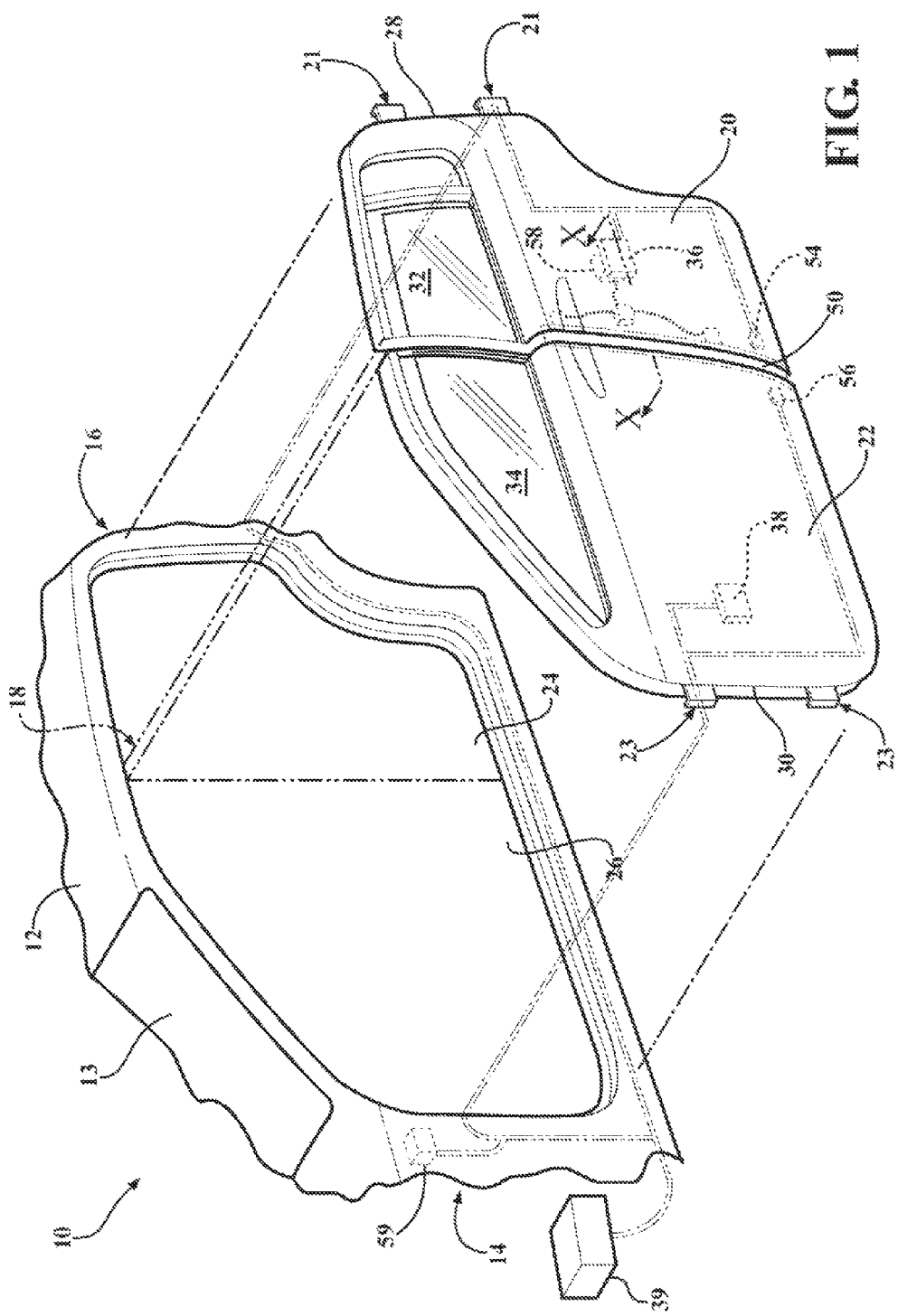
FIG. 1 is a perspective exploded schematic view of a vehicle body illustrating a front-hinged side door and a rear-hinged side door according to an embodiment; both doors are shown in an open state.

Referring to the drawings, wherein like reference numbers refer to like components, FIG. 1 shows a vehicle body 10. The body 10 includes a body shell 12, as well as openings for windows and various access doors. The body 10 encloses an interior space 13 that is adapted to accommodate vehicle passengers and their belongings. The body 10 includes a front end 14 and a rear end 16 of the vehicle.

An opening 18 is adapted to provide access into the vehicle passenger compartment, i.e., is an entryway arranged on a side of the vehicle, and is configured to be covered by two panels, a first side door 20 and a second side door 22. The first and second doors 20, 22 are "independently" openable and closable, i.e., each of the first and second doors can be opened or closed regardless of the position of the other vehicle door. Although two side doors 20, 22 are shown, a body 10 adapted to employ fewer or greater number of doors is also envisioned. The opening 18 is characterized by an absence of a B-pillar, and is thus termed "continuous". A B-pillar is a structural component that is often employed in bodies of vehicles, and is typically used for mounting miscellaneous door and body hardware, such as door hinges and wiring, and to enhance the structure of the vehicle body. Generally, whether the vehicle employs a B-pillar or not depends on the packaging and the intended use of the vehicle. The presence of a B-pillar, although a structural benefit, may restrict entry into the vehicle. Such a situation is not unusual in vehicles that employ a tightly packaged passenger compartment along with reduced width side doors, such as compact vehicles, and may also be encountered in work vehicles, such as trucks.

The first side door 20 is arranged to selectively open and close a first portion 24 of the opening 18, and second side door 22 is arranged to selectively open and close a second portion 26 of the opening 18. As configured, the second portion 26 of the opening 18 is a portion of opening 18 that remains uncovered or open when the first portion 24 is covered by the first door 20. The first portion 24 is positioned toward the rear end of the body 10, and the second portion 26 is positioned toward the front end of the body. The first door 20 is pivotably attached to the body 10 via hinges 21 at its rear or trailing edge 28, while the second door 22 is pivotably attached to the body 10 via hinges 23 at its front or leading edge 30. The first door 20 is termed as being rear-hinged, while the second door 22 is termed as being front-hinged. When opened, the first door 20 swings toward the rear end 16 of the body 10, while the second door 22 swings toward the front end 14, and are, thus, arranged as opposite swinging doors.

A window 32 is mounted on the first door 20, while a window 34 is mounted on the second door 22. The term "mounted on" is employed herein to denote mounting on the door directly or with respect to the door, such as via a separate, auxiliary component. Each of the windows 32 and 34 is adjustable for height on demand from a vehicle passenger via an individual window regulator motor. A window regulator motor 36 is mounted on the first door 20 and is adapted to adjust the height of the window 32, while a window regulator motor 38 is mounted on the second door 22 and is adapted to adjust the height of the window 34. The window regulator motors 36 and 38 are each electrically connected to and receive power from an energy source 39, such as a battery or a generator. Each window regulator motor 36, 38 is regulated to either lift or lower the respective window 32, 34 by an appropriate switch (not shown) arranged to be accessible by a passenger from the interior space 13 of the body 10.

Figure 2:
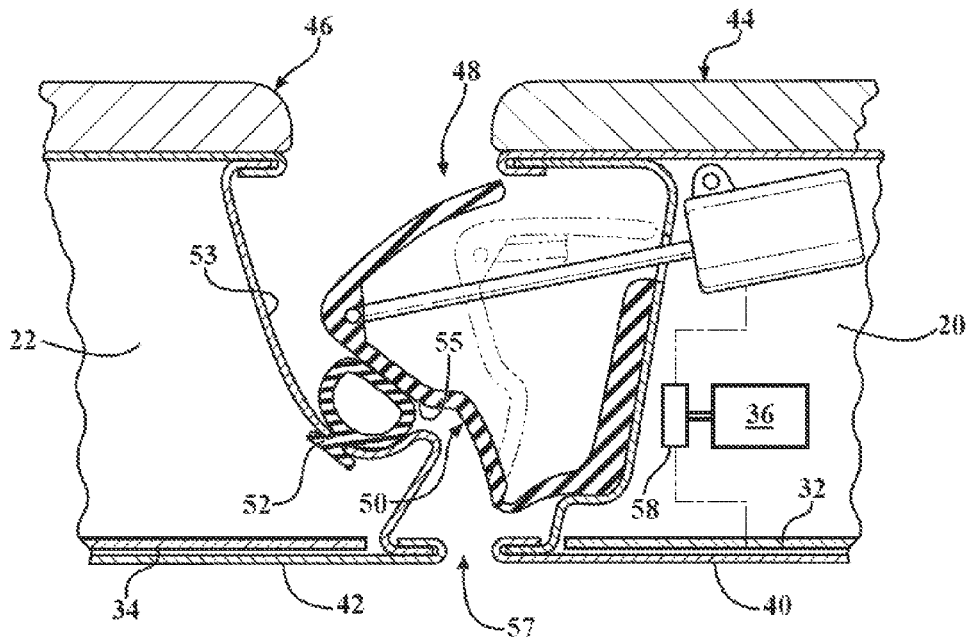
FIG. 2 is a sectional top view of a portion of the side doors shown in FIG. 1, depicting the side doors in a closed state and a device in a protracted state for sealing the doors.
Figure 3:
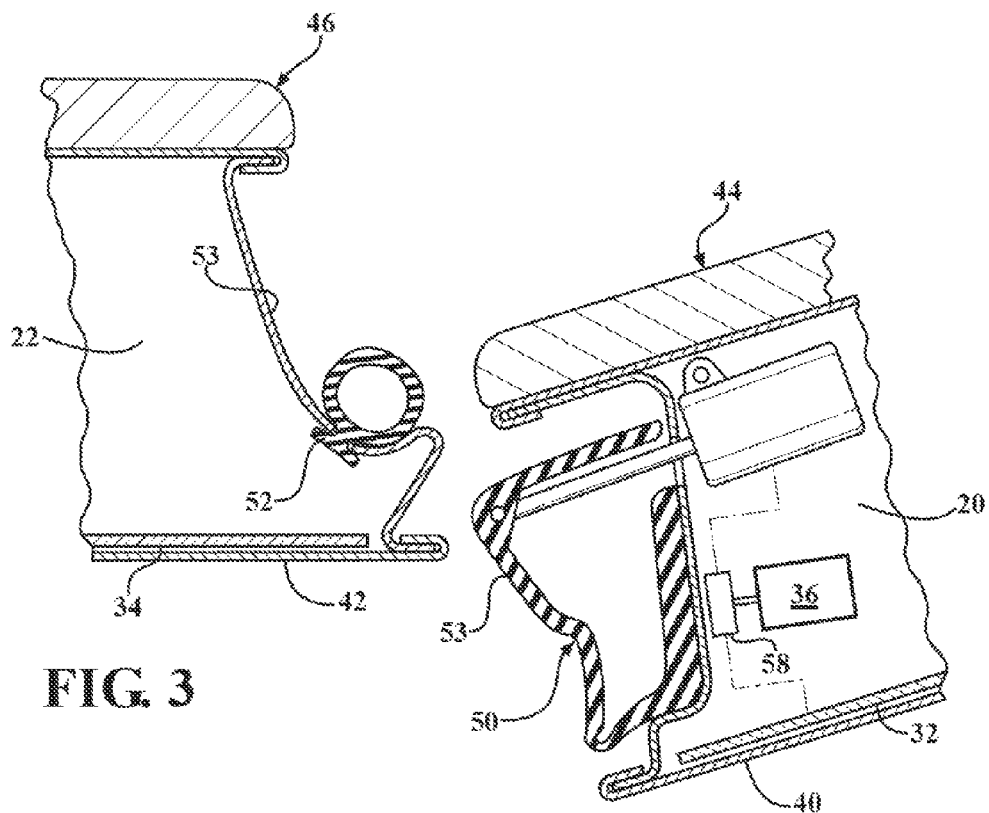
FIG. 3 is a sectional top view of a portion of the side doors shown in FIG. 1, depicting the rear-hinged door in an open state and the front-hinged door in a closed state, and the device in a retracted state.

FIGS. 2-3 show top view of body 10, as seen along a cross section X-X depicted in FIG. 1. As shown in FIGS. 2-3, each door 20 and 22 includes a respective exterior surface 40 and 42, and a respective interior surface 44 and 46. As shown in FIG. 2, when doors 20 and 22 are closed, an opening 48 remains there between. A device 50 is mounted on the first door 20 and is adapted to selectively protract when the first door is closed (as shown in FIG. 2) to cover or fill opening 48, and to retract when the first door is opened (as shown in FIG. 3). The second door 22 includes a compliant sealing member 52 adapted to be compressed by the device 50 and seal opening 18 when the first door 20 and the second door 22 are closed. The sealing member 52 is a weather strip that is mounted to a side surface 53 of the second door 22. A surface 55 of device 50 is adapted to engage and compress the sealing member 52 for seamless contact therewith when first and second doors 20, 22 are closed. Thus, with the aid of sealing member 52, when the device 50 is in its protracted position, the device seals the first door 20 against the second door 22, and thereby fills the opening 48 to protect interior space 13 from external moisture and dust.

The device 50 retracts whenever the first door 20 is opened, and does not retract when the second door 22 is opened while the first door is closed. As shown in FIG. 2, when both first and second doors 20, 22 are closed, the first and second doors substantially cover the device 50, leaving but a narrow gap 57 between exterior surfaces 40 and 42. In addition to being used to adjust the height of the window 32, the window regulator motor 36 is employed to power the device 50 and selectively retract the device when the first door 20 is opened, and to protract the device after the first door is closed. The window regulator motor 36 is thereby employed to seal the first door 20 to the second door 22 via the device 50. Therefore, the same window regulator motor 36 is adapted to actuate two separate components, a first component, window 32, and a second component, device 50. Continuous detection of whether each of the first and second doors 20, 22 is open or closed is implemented to facilitate the retraction and protraction of the device 50 at appropriate instances.

Figure 4:
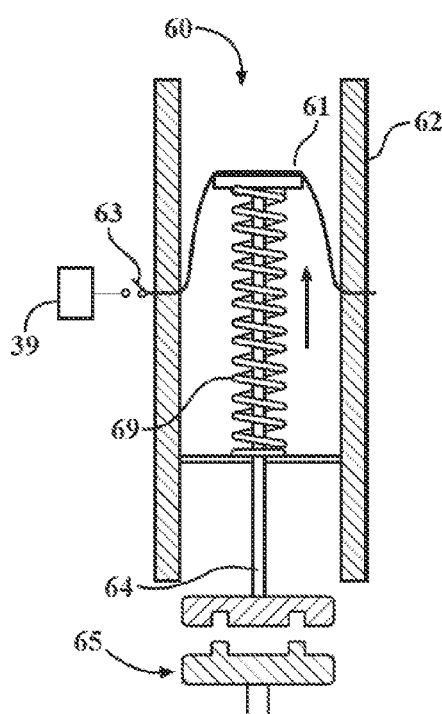
FIG. 4 is an exemplary schematic view of an actuator as employed in a clutch used to operate a window regulator motor for adjusting a window and actuating the device, the clutch shown in a non-energized state.
Figure 5:
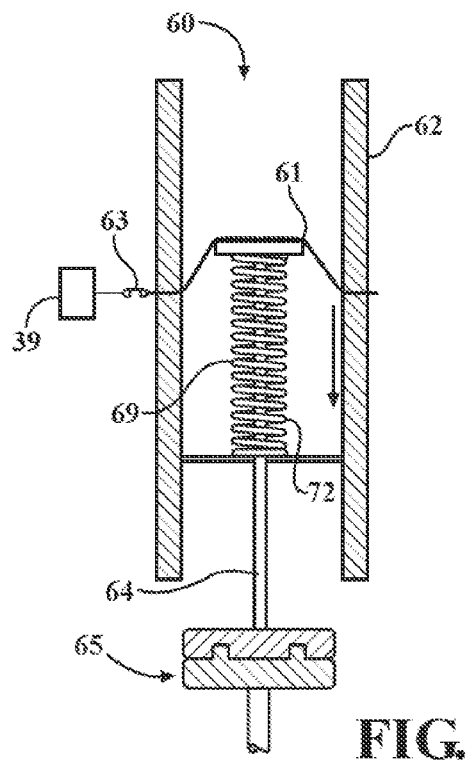
FIG. 5 is an exemplary schematic view of the actuator of FIG. 4 shown in an energized state.
Figure 6:
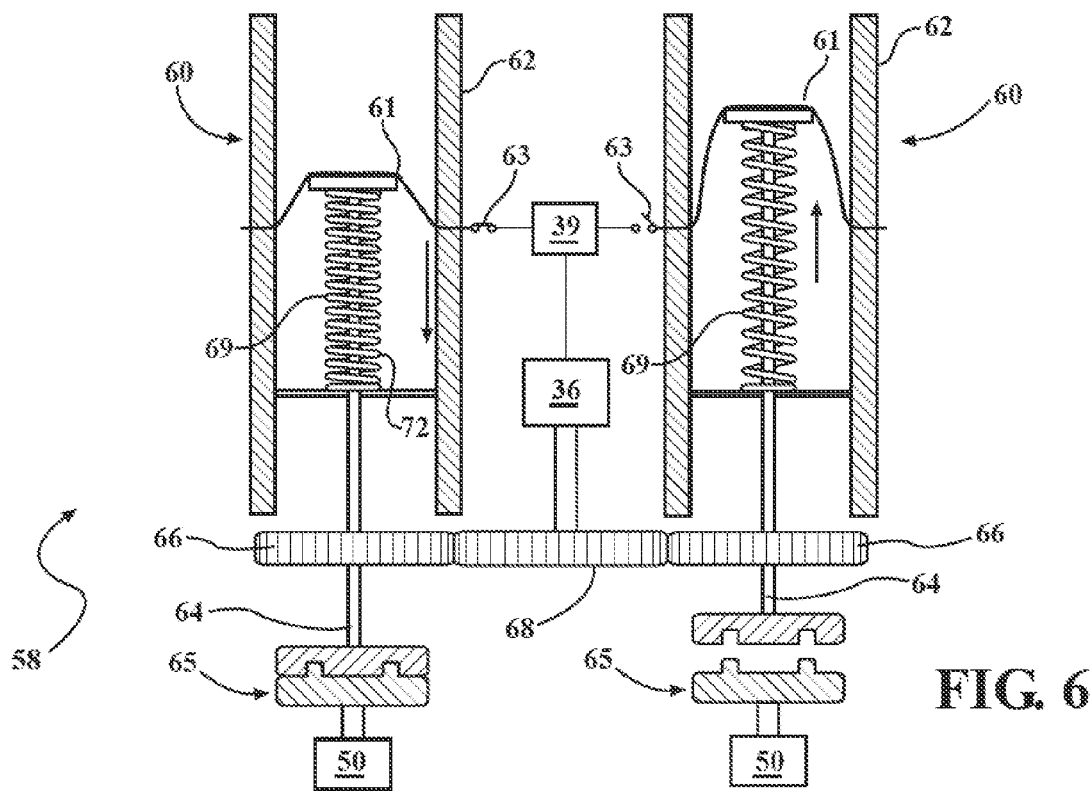
FIG. 6 is an exemplary schematic view of the clutch having two actuators of the type shown in FIGS. 4-5.

Referring back to FIG. 1, a sensor 54 is employed to detect the position of the first door 20, while a sensor 56 is employed to detect the position of the second door 22. Sensors 54 and 56 may have any appropriate configuration to affect the required detection of the position of doors 20 and 22, such as electro-mechanical switches or optical proximity sensors. As seen in FIGS. 2 and 3, a clutch 58 is operatively connected to each of the window regulator motor 36, the window 32, and the device 50. Clutch 58 is configured to operate the window regulator motor 36 either in a first mode of adjusting the height of the window 32 and selectively retracting and protracting the device 50, in a second mode of adjusting the height of the window 32, or in a third mode of selectively retracting and protracting the device 50. As such, the window regulator motor 36 is enabled via the clutch 58 to adjust the height of the window 32 and selectively retract and protract the device 50 either simultaneously or separately. The operation of clutch 58 may be regulated by a controller 59 arranged on vehicle body 10. An exemplary configuration of clutch 58 is depicted in FIGS. 4-6, where the clutch is shown as having one actuator 60 for each of the window 32 and device 50. As shown in FIGS. 4-6, each actuator 60 employs an active material member 61.

As shown in FIGS. 4-5, active material member 61 is configured as a continuous wire of constant cross-section from a shape memory alloy (SMA) that is secured inside a housing 62 of a single actuator 60. The active material member 61 may be selectively energized via an electrical current provided by the energy source 39 through a switch 63. As shown in FIG. 4, when active material member 61 is in its original shape, a shaft 64 operatively connected to a coupling device such as a dog clutch 65 is in a starting position and the dog clutch is disengaged. Active material member 61 is configured to undergo a shape change and thus translate a shaft 64 to engage dog clutch 65 when the active material member is subjected to the electrical current, as shown in FIG. 5. Active material member 61 regains its original shape when the current is taken away, and a biasing spring 69 pulls shaft 64 back to the starting position and disengages dog clutch 65.

A plurality of actuators 60 may be combined to form clutch 58, be operatively connected to the window regulator motor 36, and be used to drive multiple outputs or actuate multiple components. For example, as shown in FIG. 6, two separate actuators 60 may be employed to drive two separate shafts 64 to engage two separate dog clutches 65. Although only two actuators 60 are shown herein, as many actuators as required to drive any number of outputs may be connected to the window regulator motor 36 via clutch 58. As shown, each of two such actuators 60 is selectively energized via energy source 39 through a separate switch 63 whose closure is regulated by controller 59. Additionally, each of the two such actuators 60 is connected to window regulator motor 36 via a separate idler gear 66, wherein the separate idler gears 66 may have identical tooth counts and diameters or be dissimilar in that regard. Window regulator motor 36 is operatively connected to a gear 68. Accordingly, each idler gear 66 is driven by window regulator motor 36 via the gear 68. Thus, when active material member 61 of one of the two actuators 60 is energized, that particular active material member engages one dog clutch 65 to adjust the height of window 32. Similarly, when active material member 61 of the other of the two actuators 60 is energized, that active material member engages the other dog clutch 65 to selectively retract and protract device 50.

Although a clutch 58 is depicted as having multiple actuators 60 with active material members 61, any appropriate mechanism for operating window 32 and/or device 50 by the window regulator motor 36, such as a single or a plurality of electromechanical solenoids, may be used.

Figure 7:
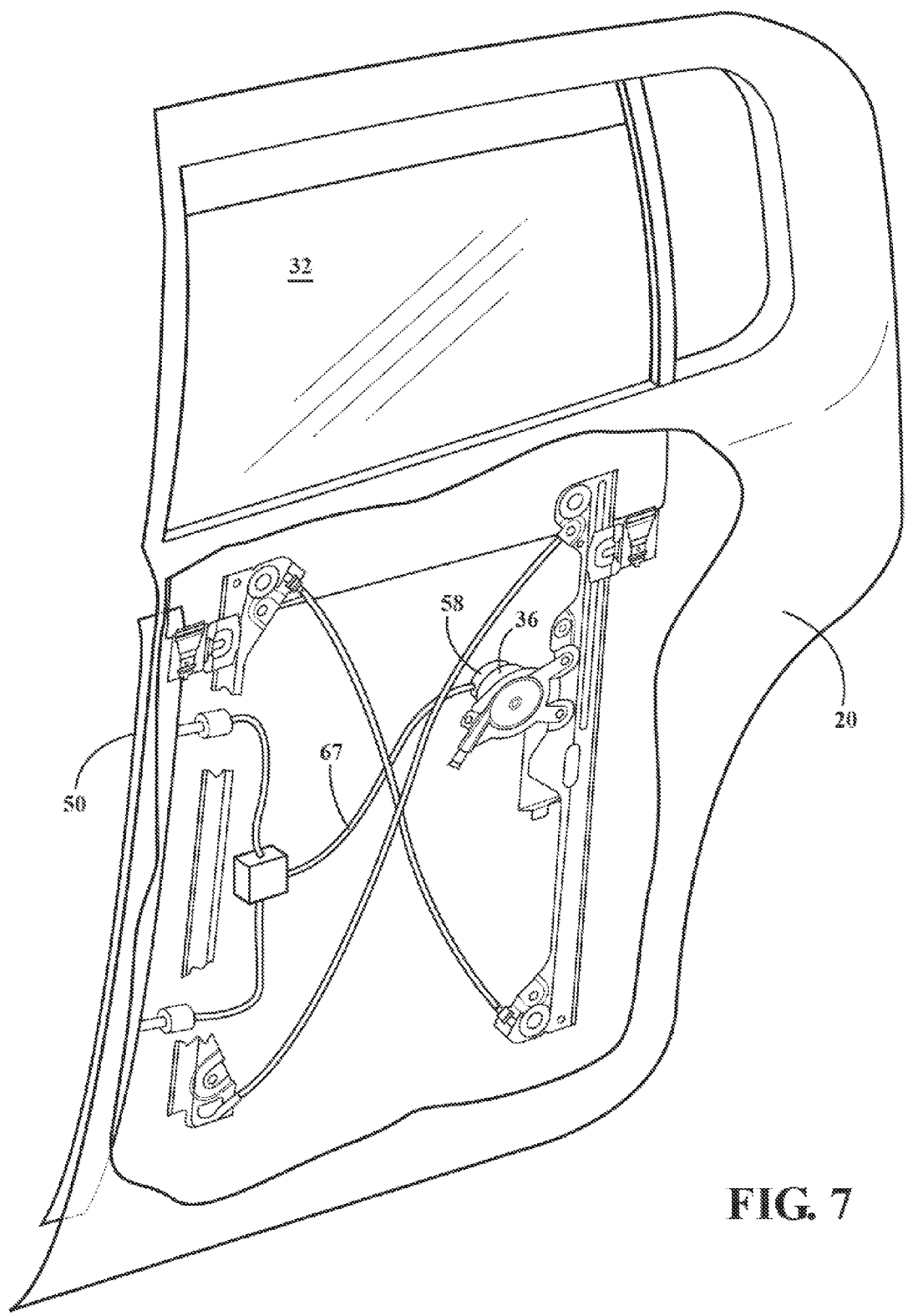
FIG. 7 is a partial cut-away view of a side door employing the window regulator motor shown in FIGS. 2-3 and the clutch shown in FIG. 6 for adjusting the window and/or actuating the device.

As illustrated in greater detail in FIG. 7, device 50 may be operatively connected to the first door 20, including being mounted thereon, and be actuated by the window regulator motor 36. Window regulator motor 36 may operate the window 32 and/or operate device 50 via the clutch 58 in the three operating modes, as described above with respect to FIG. 1. The clutch 58 is shown as being mechanically connected to each of the window regulator motor 36 and the device 50. The mechanical connection between the clutch 58 and the device 50 may be accomplished via a cable 67, as shown in FIG. 6. The cable 67 may be one of a torque transmitting and a push-pull or linear force transmitting cable. Although not shown, the device 50 may similarly be mounted on the second door 22, and be actuated by the window regulator 38. In such a case, the device 50 would retract when the second door 22 is opened, and would not retract when the first door 20 is opened while the second door is closed. The device 50 may likewise be employed to seal two opposite swinging doors on a rear end of a vehicle, as occasionally used for access to storage compartments in vans, station wagons, and sport utility vehicles (SUVs).

Figure 8:
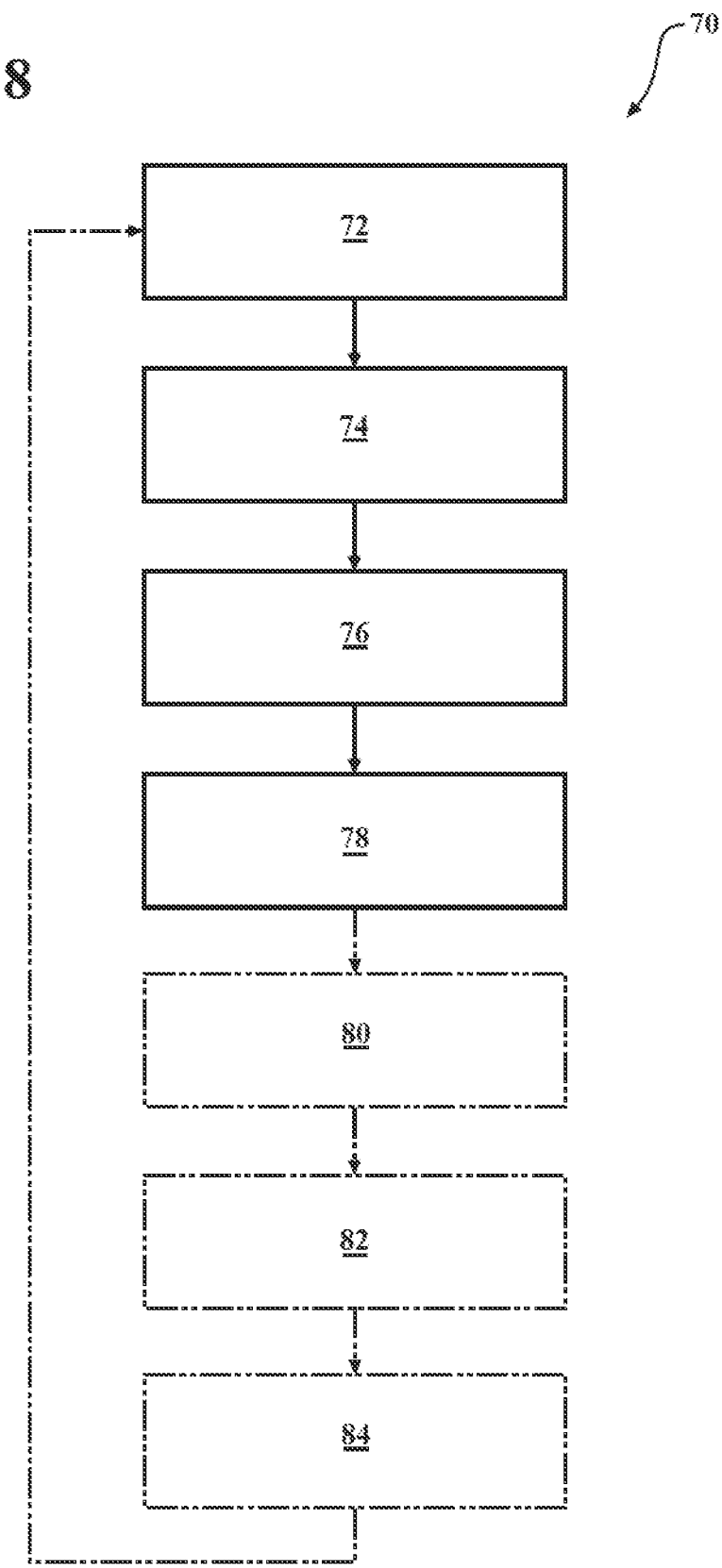
FIG. 8 is a flow chart illustrating a method for sealing an access opening in the body of a vehicle.

FIG. 8 depicts a method 70 for sealing an opening in the vehicle body 10. The method commences in frame 72 with unlatching first door 20 in order to uncover the first portion 24 of the opening 18. Following frame 72, the method proceeds to frame 74 where it includes detecting whether the first door 20 has been unlatched. After frame 74, the method proceeds to frame 76 where it includes retracting the device 50. When the device 50 has been retracted, the method advances to frame 78 where the first door 20 may be opened to uncover the first portion 24 of the opening 18.

Following frame 78, the method may additionally proceed to frame 80, where it includes detecting whether the second door 22 is closed via sensor 56. If the second door 22 is closed, the method may proceed to frame 82, where it includes protracting the device 50 by the window regulator motor 36 to seal the first door 20 to the second door 22. After frame 82, the method may advance to frame 84, where it includes closing the first door 20 to cover the first portion 24 of the opening 18. Additionally, according to the method, the device 50 may be selectively retracted and protracted simultaneously with or separately from adjusting the height of the window 32 in the three modes, as described above with respect to FIG. 1. Following frame 84, both first door 20 and second door 22 are closed, and the method may return to frame 72 to recommence opening the first and second doors.

While the best modes for carrying out the invention have been described in detail, those familiar with the art to which this invention relates will recognize various alternative designs and embodiments for practicing the invention within the scope of the appended claims.

The invention claimed is:

1. An actuating system for a vehicle having a body that defines an access opening, the system comprising:
    a first door arranged to selectively open and close at least a first portion of the opening;
    a window operatively connected to the first door and arranged to be adjusted for height;
    a device operatively connected to the first door and configured to retract when the first door is opened and protract when the first door is closed to thereby seal the at least a first portion of the opening;
    a window regulator motor mounted on the first door and configured to adjust the height of the window and selectively retract and protract the device; and
    a clutch operatively connected to each of the window regulator motor, the window, and the device, wherein the clutch is configured to operate the window regulator motor in a first mode of adjusting the height of the window and selectively retracting and protracting the device, a second mode of adjusting the height of the window without operating the device, and a third mode of selectively retracting and protracting the device without adjusting the height of the window.

2. The system of claim 1, wherein the clutch employs a shape memory alloy material selectively energized to operate the window regulator motor in one of the first, second, and third modes.

3. The system of claim 1, wherein the clutch is connected to the device via at least one of a torque transmitting cable and a linear force transmitting cable.

4. The system of claim 1, further comprising a second door arranged to selectively open and close a second portion of the opening that remains open when the first door is closed.

5. The system of claim 4, wherein the device is adapted to seal the first door to the second door when the second door is closed.

6. The system of claim 5, wherein the vehicle body is characterized by a front end, a rear end, and an absence of a B-pillar, and wherein:
    the opening is an entryway on a side of the vehicle;
    the at least a first portion of the opening is positioned toward the rear end of the vehicle and the second portion of the opening is positioned toward the front end of the vehicle;
    the first door is rear-hinged; and
    the second door is front-hinged.

7. A vehicle comprising:
    a body having a front end and a rear end, and defining an access opening; and
    a system for sealing the opening, the system having:
        a first door arranged to selectively open and close at least a first portion of the opening;
        a window mounted on the first door and arranged to be adjusted for height;
        a device operatively connected to the first door and configured to retract when the first door is opened and protract when the first door is closed to thereby seal the at least a first portion of the opening;

a window regulator motor operatively connected to the first door and configured to adjust the height of the window and selectively retract and protract the device; and a clutch operatively connected to each of the window regulator motor, the window, and the device, wherein the clutch is configured to operate the window regulator motor in a first mode of adjusting the height of the window and selectively retracting and protracting the device, a second mode of adjusting the height of the window without operating the device, and a third mode of selectively retracting and protracting the device without adjusting the height of the window.

8. The vehicle of claim 7, wherein the clutch employs a shape memory alloy material selectively energized to operate the window regulator motor in one of the first, second, and third modes.

9. The vehicle of claim 7, wherein the clutch is connected to the device via at least one of a torque transmitting cable and a linear force transmitting cable.

10. The vehicle of claim 7, further comprising a second door arranged to selectively open and close a second portion of the opening that remains open when the first door is closed.

11. The vehicle of claim 10, wherein the device is adapted to seal the first door to the second door when the second door is closed.

12. The vehicle of claim 11, wherein the vehicle body is characterized by an absence of a B-pillar, and wherein:

the access opening is an entryway on a side of the vehicle;

the at least a first portion of the opening is positioned toward the rear end of the vehicle and the second portion of the opening is positioned toward the front end of the vehicle;

the first door is rear-hinged; and the second door is front-hinged.

13. A method for sealing an access opening in a body of a vehicle having a front end and a rear end, the method comprising:

unlatching a first door that is arranged to selectively open and close a first portion of the opening, the door having a window that is arranged to be adjusted for height by a window regulator motor;

detecting whether the first door has been unlatched;

retracting a device operatively connected to the first door by the window regulator motor such that the first door may be opened to uncover the at least a first portion of the opening, wherein the device is adapted to seal the first door against a second door that is arranged to selectively open and close a second portion of the opening that remains open when the first door is closed; and operating the window regulator motor via a clutch, wherein the clutch is configured to operate the window regulator motor in a first mode of adjusting the height of the window and selectively retracting and protracting the device, a second mode of adjusting the height of the window without operating the device, and a third mode of selectively retracting and protracting the device without adjusting the height of the window.

14. The method of claim 13, further comprising:

detecting whether the second door is closed;

closing the first door to cover the at least a first portion of the opening; and protracting the device by the window regulator motor to seal the first door against the second door when the second door is closed.

15. The method of claim 13, wherein the clutch employs a shape memory alloy material, and said operating of the window regulator motor is accomplished by selectively energizing the shape memory alloy material.

16. The method of claim 13, wherein the vehicle body is characterized by an absence of a B-pillar, and wherein:

the access opening is an entryway on a side of the vehicle;

the at least a first portion of the opening is positioned toward the rear end of the vehicle and the second portion of the opening is positioned toward the front end of the vehicle;

the first door is rear-hinged; and the second door is front-hinged.

\* \* \* \* \*